United States Patent [19]

Ochi et al.

[11] Patent Number: 5,724,915
[45] Date of Patent: Mar. 10, 1998

[54] MATERIAL FOR THE TREATMENT OF PET EXCRETION AND METHOD OF PRODUCING THE SAME MATERIAL

[75] Inventors: Kengo Ochi; Yuko Kawasaki, both of Mitoyo; Takashi Sumiya; Yukio Zenitani, both of Kyoto, all of Japan

[73] Assignees: Sanyo Chemical Industries, Ltd., Kyoto; Uni-Charm Corporation, Ehime, both of Japan

[21] Appl. No.: 676,008

[22] Filed: Jul. 5, 1996

[30] Foreign Application Priority Data

Jul. 7, 1995 [JP] Japan .................................. 7-195854

[51] Int. Cl.$^6$ .................................................. A01K 29/00
[52] U.S. Cl. ......................................................... 119/173
[58] Field of Search ................................... 119/165–168

[56] References Cited

FOREIGN PATENT DOCUMENTS

| 01108927 | 4/1989 | Japan . |
| 04335841 | 11/1992 | Japan . |
| 06022659 | 2/1994 | Japan . |

*Primary Examiner*—Thomas Price
*Attorney, Agent, or Firm*—Finnegan, Henderson, Farabow, Garrett & Dunner

[57] ABSTRACT

A material and a method for preparing the same for treating excretions of pet animals comprising: 100 parts by weight of substrate (A) selected from an inorganic powder, short organic fibers, crushed cellulose, or granulated forms thereof coated with from 5–300 parts by weight of a water-absorbent resin/fiber composite (B), the composite (B) being a mixture of a water-absorbent resin fine powder, a fibrous substance and optionally a hydrophilic thermoplastic substance.

17 Claims, No Drawings

5,724,915

MATERIAL FOR THE TREATMENT OF PET EXCRETION AND METHOD OF PRODUCING THE SAME MATERIAL

BACKGROUND OF THE INVENTION

1. Field of the Invention

This invention relates to material used in the treatment of pet and animal excretions. Specifically, this invention relates to materials that enable the convenient and effective treatment of cat, dog, and other animal excretions.

2. Description of the Prior Art

Sand has traditionally been used in the treatment of pet and other animal excretions. Sand is spread in the animal's cage or litter box and replaced after the animal deposits its excretions there. This is an inconvenient method, however, because pieces of sand containing animal excretions are scattered outside of the intended area when the animal enters and leaves the cage or litter box. For this reason, there have been recent attempts to find materials that readily absorb liquids and that have granules, which, after absorbing liquid, readily adhere together to form into clumps (that is, efficient formability), thereby inhibiting the scattering of particles and enabling easy disposal.

However, materials using bentonite or other crushed clayey minerals or using starch, CMC or other viscous substances created new problems, because of the slow absorption speed and small absorption quantity of the clayey minerals and viscous substances themselves for urine or other excretions.

The problems are that the excretion works its way to the bottom of the cage or litter box and soils it, or that much treating material is necessary even to form small quantity of excretions into clumps, and thereby increasing amount of generated waste.

There have been recent studies on a variety of materials that employ water-absorbent resins, as materials that solve these problems.

Known examples include:

1. a material obtained by mixing zeolite particles and other inorganic particles with specific amounts of water-absorbent resin and water, then granulating the mixture (Japanese Patent Application Laid-Open No. 108927/1989);
2. a material obtained by granulating, then drying, composition derived from paper-making residue, water-absorbent resin, and water-soluble inorganic salts (Japanese Patent Publication No. 6767/1991);
3. a material obtained by granulating a composition derived from natural organic substance, water-absorbent resin, and a binder (Japanese Patent Publication No. 46089/1991);
4. a material consisting of a first composition derived from water-absorbent resin having high gel strength, and pulp or other fillers as core layer, and a second composition derived from viscous water-absorbent resin and pulp or other fillers as skin layer (Japanese Patent Publication No. 22659/1994)
5. a material obtained by coating the surface of substrate with water-absorbent resin (Japanese Patent Publication No. 335841/1992).

SUMMARY OF THE INVENTION

Objects and Features of the Invention

The absorption ability of the said excretion treating materials (1 to 4) is improved by water-absorbent resin combined with either inorganic particles, paper-making residue, pulp or other natural organic matter, pulp or other fillers, or other materials, in the granules.

However, these granulated materials include a considerable amount of inorganic matter, paper-making residue, other natural organic matter, fillers, or other materials as compared with amount of water-absorbent resins.

As a result, water-absorbent resin is inhibited from contacting tightly together and becomes less adhesive, and the treating substrates are not formed into clumps after absorbing urine, or even if formed into clumps, they become fragile which renders it difficult for clumps to maintain their clumpy shape.

Regarding the material (⑤) obtained by coating the surface of substrate with water-absorbent resin, the water-absorbent resin applied on the surface of the substrate works effectively, has relatively low swelling magnification, and has many points of contact with each other. As a result, the treating material (⑤) is more efficiently formed into clumps.

On the other hand, however, water-absorbent resin tends to easily fall off the surface of the substrate because the surface is sprinkled with water-absorbent resin. As a result, falling-off water-absorbent resin accumulates at the bottom of the cage or litter box, or sticks to the paws and fur of pets, thereby being scattered over the room.

The inventors have tested the methods such as adding a large volume of water and adding binder when coating, in order to prevent water-absorbent resin from falling off.

However, the addition of a large amount of water caused water-absorbent resin to stick together when the treating material was formed, and the specific surface area of water-absorbent resin became smaller, thereby extremely decreasing water-absorption speed and the absorption rate.

As for the method of adding binder to prevent water-absorbent resin from falling off, binder inhibited water-absorbent resin from absorbing, so decreased water-absorption speed or absorption power. Binder also inhibited water-absorbent resin from contacting together, so caused a reduction in adhesion thereof.

The inventors conducted careful studies to solve the above-mentioned problems, which were accompanied by use of water-absorbent resin. As a result, the inventors produced materials that had a substrate coated by the complex of water-absorbent resin and specific fiber length of fibrous substance combined in specific ratio. The inventors found that the resulting materials formed into clumps for the use of excretion treatment did not easily disintegrate its own shape when absorbing liquid, and had excellent adhesive strength, caused little falling-off of water-absorbent resin, and maintained high absorption speed.

Therefore, an object of the invention is to provide improved materials for the treatment of pet excretions which are capable of absorbing a given amount of urine with less consumption of the treating material in a short period of time.

It is a further object of the invention to provide materials (hereafter, referred to as the "Treating Material") for the treatment of pet excretions which may easily adhere to each other to quickly form agglomerated lumps when urine is absorbed, so that the part which has absorbed excretion can be easily removed for disposal.

According to this invention, a Treating Material comprises:

100 parts by weight of substrate (A) for the treatment of excretions, selected from the group consisting of inorganic powder, organic single fiber, crushed cellulose, and granulated substance thereof, the substrate (A) having a surface; and 5–300 parts by weight of water-absorbent resin/fiber composite or complex (B) mentioned below.

The surface of the substrate (A) is coated with the complex (B). The water-absorbent resin/fiber complex (B) is obtainable by mixing more than 50 wt. % and no more than 95 wt. % of water-absorbent resin fine powder (1); no less than 5 wt. % and less than 50 wt. % of fibrous substance (2) having from 50 to 2,000 μm of average fiber length; and optionally no more than 10 wt. % of hydrophilic thermoplastic substance (3).

Also according to this invention, a method of producing a material for treating excretions of pet animals comprises the steps of:

adding 3–200 parts by weight of water and 5–300 parts by weight of water-absorbent resin/fiber complex (B) mentioned below, to 100 parts by weight of substrate (A) for the treatment of excretions, which is selected from the group consisting of inorganic powder, organic single fiber, crushed cellulose, and granulated substance thereof;

coating the surface of the substrate (A) with the complex (B); and optionally drying the resulting composition.

Effect of the Invention (1) By coating the surface of the substrate with the complex comprising relatively much water-absorbent resin fine powder and relatively little fibrous substance having specific fiber length, much water-absorbent resin fine powder can be arranged on the surface of the Treating Material. Accordingly;

①  Water-absorbent resin can be efficiently used, and high adhesive gummous clumps were formed when urine was absorbed because the number of points of each water-absorbent resin which contacting with other resins could be much increased. At the same time, ②  Adding a relatively small amount of fibrous substance having specific fiber length enables the effective matrix structure to form on the surface of the Treating Material. Therefore, the Treating Materials provide benefits that the effect that little water-absorbent resin powder falls off the surface thereof was also shown.

Conventionally, there were no materials sufficient with respect to both of above-mentioned functions, but by this invention both of the functions can be improved sufficiently and simultaneously. In addition, ③ The usage of capillarity of fiber enables water-absorbent resin to absorb urine more swiftly and uniformly comparing to water-absorbent resin alone. Therefore, both the absorption speed and the absorption rate are also excellent.

(2) As a result of the above-mentioned functions, when the Treating Material of this invention is used, it absorbs pet and other animal urine, and the absorbed Materials form together into high adhesive gummous clumps. The formed clumps are excellent in maintaining their shapes, thereby not breaking at all with being stepped by pet or other animal, nor with being dropped when removing.

Accordingly, the water-absorbed formed clumps can be easily removed with pincette or other simple appliance from the rest of the Treating Material at a desirable time.

(3) The bottom of the cage or litter box is not soiled and the amount of generated waste is very small, because a small quantity of the Treating Material can absorb quickly a large amount of urine. In addition, (4) Water-absorbent resin fine powder scarcely fall off the Treating Material, so that the resin fine powder neither separates from each other at the time of transport nor drops at the time of use. Accordingly, small grains of the Treating Material scarcely stick to the paws or fur of the pet or other animal and does not soil the room.

The above description of the efficacy shows that the Treating Material of this invention is useful in the treatment and disposal of pet and other animal excretions.

DETAILED DESCRIPTION OF THE INVENTION

Examples of water-absorbent resin fine powder (1) used in this invention are as follows:

Example ① of a water-absorbent resin fine powder that is obtained by polymerizing as the essential components: starch or cellulose (hereafter referred to as component (a)); water-soluble monomer that contains carboxyl group, sulfo group, or other hydrophilic groups and/or a monomer rendered water-soluble through hydrolysis (hereafter referred to as component (b)); and a crosslinking agent (hereafter referred to as component (c)), and optionally and subsequently performing hydrolysis.

The details concerning components (a), (b), and (c), listed above, which are used in the manufacture of the water-absorbent resin described above, and the proportions and methods of manufacture of these components (a), (b), and (c), as well as concrete examples of the resins are described in Japanese Patent Application Laid-Open No. 25886/1977, Japanese Patent Publication No. 46199/1978, No. 46200/1978, and No. 21041/1980.

Example of (a) include raw starches such as sweet potato starch, potato starch, wheat starch, corn starch, rice starch, and tapioca starch: processed starch such as oxidized starch, dialdehyde starch, alkylated starch, oxy alkylated starch, amino-ethylated starch, and cyanoethylated starch; and celluloses such as natural cellulose, carboxymethylcellulose, and cellulose ether.

Example of (b) include monomers possessing a carboxyl group such as (meth)acrylic acid and maleic anhydride: monomers possessing a carboxylate group such as sodium (meth)acrylate, sodium maleate, trimethylamine salt of (meth)acrylic acid, and triethanolamine salt of (meth)acrylic acid: monomers possessing a sulfonic acid group such as vinyl sulfonic acid, vinyl toluene sulfonic acid and sulfopropyl (meth)acrylate: and monomers possessing a sulfonate group such as sodium vinyl sulfonate, methylamine salt of vinyl sulfonic acid, and diethanolamine salt of sulfopropyl (meth)acrylate.

Example of (c) include polyols such as ethyleneglycol and trimethylolpropane; bisacrylamides such as N,N-methylenebisacrylamide; multifunctional (meth)acrylic esters such as ethyleneglycol di(meth)acrylate, polyethyleneglycol di(meth)acrylate, and trimethylolpropane tri(meth)acrylate; methylol(meth)acrylamide; glyoxal; etc.

Four more examples (② through ⑤) of water-absorbent resin fine powder(1), in addition to the example described above, are as follows:

② Fine powder of those obtainable by polymerizing the components (a) and (b), e.g., a hydrolyzed product of starch-acrylonitrile graft polymer and a hydrolyzed product of cellulose-acrylonitrile graft polymer;

③ Fine powder of crosslinked material of component (a), e.g., a crosslinked product of carboxyl methylcellulose;

④ Fine powder of a copolymer of components (b) and (c), e.g., a partially-hydrolyzed product of crosslinked polyacrylamide, crosslinked acrylic acid-acrylamide copolymer, crosslinked sulfonated polystyrene, saponified vinylester-unsaturated carboxylic acid copolymer disclosed in Japanese Patent Application Laid-Open No. 14689/1977 and No. 27455/1977, salt of crosslinked polyacrylic acid, crosslinked acrylic acid-acrylic acid ester copolymer, crosslinked isobutylene-maleic acid anhydride copolymer, and crosslinked carboxylic-acid denatured polyvinyl alcohol; and ⑤ Fine powder of a self-crosslinking polymerization product using component (b), e.g., self-crosslinkable polyacrylates. The water-absorbent resin fine powder presented as examples above may also be employed in combinations of two or more.

The water-absorbent resin fine powders that work best with this invention are above ① and some of ④ such as the partially-hydrolyzed product of crosslinked polyacrylamide, crosslinked acrylic acid-acrylamide copolymer, crosslinked polyacrylic acid, crosslinked acrylic acid-acrylic acid ester copolymer, crosslinked isobutylene-maleic acid anhydride copolymer, and crosslinked carboxylic acid denatured polyvinyl alcohol.

Each fine powder of a product obtainable by surface-crosslinking the resin and a product of which the absorption speed is increased by the addition of surface-active agent or a similar agent can also be preferably employed.

The water-absorbent resin fine powder (1) has a water absorption capability with respect to pure water of at least 50 ml/g in general, and should ideally be able to absorb 100–1,000 ml/g. The average particle diameter of this resin fine powder (1) is generally no more than 400 µm; ideally 1–150 µm. If the average particle diameter of the resin fine powder (1) exceeds 400 µm, the water-absorption speed is decreased, and thereby reducing the absorption rate of the Treating Materials, and in a bad case urine passes through the Treating Materials to soil the bottom of the cage or litter box.

The fibrous substance (2) becomes matrix of complex (B) to prevent water-absorbent resin from falling off the substrate. The average fiber length of the substance (2) is generally 50–2,000 µm, ideally 100–1,000 µm, further ideally 200–800 µm. If the average fiber length of (2) falls below 50 µm, the matrix formation by fiber can not be expected, therefore the water-absorbent resin fine powder (1) easily falls off. On the other hand, if the average fiber length of (2) exceeds 2,000 µm, water-absorbent resin fine powder (1) and fibrous substance (2) are hardly mixed uniformly, thereby causing the separation of fine powder (1) and fibrous substance (2); or the difficulty for complex (B) to coat substrate (A); or the decrease in fluidity of the complex (B) resulting in the extreme inefficiency of the work.

Even if average fiber length of the fibrous substance (2) is in the range of 50–2,000 µm, when the fiber of no longer than 30 µm is contained too much in the substance (2), the matrix formation by fiber becomes partially difficult, and therefore, water-absorbent resin fine powder (1) or fiber itself may fall off. For this reason, the content of the fiber of no longer than 30 µm is ideally no more than 30 wt. % of overall fibrous substance (2), further ideally no more than 20 wt. %.

There are no specific limits to the diameter of fibrous substance (2), but it is generally 0.1–100 µm, ideally 1–50µm.

The fibrous substance (2) may have same composition as that of generally used fiber's. But the fibrous substance (2) that works best with this invention is hydrophilic fiber which can help absorption of urine and thermoplastic fiber which can form fiber matrix by being heated at relatively lower temperature.

The hydrophilic fibers are such as cellulose fiber, and rayon fiber. The thermoplastic fibers are such as polyethylene fiber, polypropylene fiber, and polyethylene-polypropylene complex fiber. The fibrous substance (2) that works best with this invention, among the above examples, is cellulose fiber as the hydrophilic fiber and polyethylene-polypropylene complex fiber as the thermoplastic fiber. These fibers may be employed alone or in the mixture of two or more.

Water-absorbent resin/fiber complex (B) used in this invention is obtainable by mixing water-absorbent resin fine powder (1), fibrous substance (2) and, when necessary, hydrophilic thermoplastic substance (3). Complex (B) not only includes water-absorbent resin fine powder (1) and fibrous substance (2), but also may include hydrophilic thermoplastic substance (3) when necessary in purpose of bonding (1) and (2) more tightly.

The hydrophilic thermoplastic substance (3) that works best with this invention is basically hydrophilic substance, and is solid at room temperature, as well as comes to liquidus by being heated at approximately 100° C. Through the step such as drying, the substance (3) bonds resin fine powder (1) and fibrous substance (2), more tightly, so effectively prevents resin fine powder (1) from falling off.

The examples of this substance (3) are mean molecular weight 3,000 or more of polyethylene glycol, urethane joint compound of polyethylene glycol, ester joint compound of polyethylene glycol, and so on.

Three methods of preparing complex (B) are illustrated as follows:
1. method of putting water-absorbent resin fine powder (1), fibrous substance (2), and optionally hydrophilic thermoplastic substance (3) into a general mixer to combine them;
2. method of adding a small amount of water while combining;
3. method of heating the mixture after combining.

The content of water-absorbent resin fine powder (1) in said complex is generally more than 50 wt. % and no more than 95 wt. %, ideally 60–90 wt. %, still ideally 70–90 wt. %.

If the content of water-absorbent resin fine powder (1) is no more than 50%, that is, the content of fibrous substance (2) is no less than 50 wt. %, the Treating Material becomes insufficiently clumpy when it absorbs urine, or although it may become clumpy, the clumps easily lose their shape because of their weak adhesion.

On the other hand, if the content of water-absorbent resin fine powder (1) is more than 95 wt. %, that is, the content of fibrous substance is relatively less than 5 wt. %, the effect of matrix forming by fibrous substance (2) becomes poor. Therefore, after the substrate (A) is coated with complex (B), a large amount of water-absorbent resin fine powder (1) would fall off said substrate (A).

When hydrophilic thermoplastic substance (3) is used, the content thereof in complex (B) is generally no more than 10 wt. %, ideally no more than 5 wt. %. If the content of (3) is more than 10 wt. %, the substance (3) becomes too much; and when urine is absorbed, complex (B) becomes less sticky and thereby decreasing the absorption speed.

Said substrate (A) forms the Treating Material used in this invention into fixed shape of fixed size so as to prevent said Treating Material from scattering out of animals cage. As for the example of such substrate, is;

(A1) inorganic powder such as kaolin, bentonite, silica sand, loam balloon, diatomaceous earth, clay, zeolite, fly ash;

(A2) organic short fiber made by cutting shortly the natural fiber such as pulp, straw, grass charcoal, peat moss; or the artificial fiber such as cellulose, rayon, polyester, polyamide;

(A3) crushed cellulose such as sawdust, paper (newspaper, cardboard, magazine);

(A4) material obtainable by granulating anything selected from among (A1)–(A3).

The particle diameters (longer diameter) of these inorganic powder (A1) and crushed cellulose (A) are generally 1–800 μm, ideally 5–200 μm. The length of organic short fiber (A3) is generally 0.001–20 mm, ideally 0.01–10 mm.

The granulated material (A4) can be formed into a wide variety of shapes, as desired. For example, it can be formed into spherical, cylindrical, plate-like, rock-like, rectangular, conical, pyramidal, rod-like, and so forth. Granules preferably have a maximum diameter of from 0.1–50 mm, no matter what the shape; ideally, the diameter is from 0.5–30 mm. There are no specific limits to the apparent density of the resulting granulated materials, but adjusted to be generally 0.01–1.0 g/ml; ideally, 0.05–0.8 g/ml.

These substrates (A) may be employed alone and also in mixture of two or more.

(A4) is ideal among these substrates. To manufacture the granulated material (A4), there are two methods:

① Adding water as binder to (A1), (A2) or (A3) as they are being stirred or being rolled on a tray, thereby forming granules (This is referred to as wet-granulating method);

② Using compression to form anything from selected the group of (A1), (A2) and (A3) into granules.

When the manufacturing method ① in which water is added is used, the substrate (A1)–(A3) is put in either a Nauta mixer, ribbon mixer, conical blender, mortar mixer, or all-purpose mixer, then water is added as uniformly as possible while the substrate (A1)–(A3) is being stirred, or being rolled on a rolling granulator, tray-type vibrator or tray-type rotary machine. This simple process results in the formation of the necessary granules. Water can be added to the substrate (A1)–(A3) while it is being stirred by a variety of methods such as spraying on, blowing on in the form of water vapor, or storing (A1)–(A3) in high humidity and allowing it to absorb moisture.

Generally water is used as binder, but when necessary, inorganic salts, alcohol, ethylene glycol, propylene glycol, glycerol, polyethylene glycol, polyvinyl alcohol, surface-active agents, or other substances can be added to achieve a binding effect or to increase the permeability of the water into the granulated substrate (A4), as well as water.

The amount of water that is added differs depending on the kind of (A1)–(A3) used. Generally, however, the amount of water to use is from 1% to 300% of the overall weight; ideally, it is from 2% to 200% of the overall weight. If the amount of added water exceeds the general value, the granules (A4) become soft, lose their shape, or cling together. In this case, the granules (A4) that are once formed can be dried to eliminate the trouble cause. However, adding an appropriate amount of water to the (A1)–(A3) to form granules in a way that does not require re-drying is preferable method of producing the granules from the economical perspective. Conversely, if the amount of added water falls below the general value, the granules cannot be sufficiently formed.

The speed of granule formation, the strength of the formed granules, and other aspects of the granules can be improved by forming the granules at a temperature between 40° C. and 90° C.

Concrete examples of the method of producing the substrate (A4) whereby (A1)–(A3) is formed into granules using compression include: using a mold that is designed with the appropriate shape and size, then pressure-molding the (A1)–(A3) into pellets; and, pressure-molding the (A1)–(A3) into either sheets, bars or blocks, first, then cutting or crushing it into the appropriate size. The above pressure-molding methods are generally conducted at room temperature, but conducting them at higher temperatures (e.g., 30°–300° C.) or increased humidity (e.g., 2–100%) will not obstruct the process.

The appropriate degree of compression to be used in this process can be selected based on the type of (A1)–(A3), the size of the granules, the overall property of the mixture, and other factors. Normally, the pressure is to be from 1 to 3,000 kg/cm$^2$; ideally, it is to be from 10 to 2000 kg/cm$^2$.

Pressure-molding can be conducted using a roller-type pressure-molding machine (e.g., a compacting press machine or a briquetting press machine), a piston-type pressure-molding machine, a screw-type pressure-molding machine, a perforated extrusion-molding machine, or other kinds of pressure-molding machines. The resultant material from this pressure molding can be further cut or crushed, as necessary, to achieve the appropriate shape and size of granule (A4).

The materials for the treatment of excretion pertaining to this invention are obtained by adding the complex (B) to the substrate (A) to coat the surface of the substrate (A) with the complex(B).

The content of complex (B) that is coated on the surface of substrate(A) is preferably 5–30 parts by weight when the overall of substrate(A) is 100 parts by weight, ideally 30–250 parts by weight, further ideally 50–200 parts by weight.

If the coating content of complex(B) falls below 5 parts by weight, the degree of swelling of water-absorbent resin fine powder will be too large to adhere together when pet urine is absorbed, thereby becoming unable to be formed into clumps.

On the other hand, if the coating content of complex (B) exceeds 300 parts by weight, a large amount of water-absorbent resin will fall off and furthermore it is uneconomical.

The method of coating the surface of substrate(A) with complex(B) differs a little depending on whether fibrous substance (2) used for complex (B) is hydrophilic fiber or thermoplastic fiber. The coating, however, is performed by blending mechanically substrate (A) and complex (B). For example, according to this invention, in condition that water exists on the surface of the substrate (A), complex (B) is mechanically blended or granulated with substrate (A). Then, water functions as binder and complex (B) adheres to the surface of substrate. This adhesion results in the coating state.

Accordingly, if the amount of water in the substrate (A) is too little, the adhesion will be insufficient. Conversely, if the amount of water is too much, the complexes (B) adhered to the surface of the substrate(A) will cause blocking together during production process, and the resulting Materials for Treatment will form into clumps before actually used for excretion, which render the following process such as transferring to dryer, drying, and packaging, difficult to handle.

The appropriate amount of water used in this invention differs depending on the kind, property, shape, grain size or other factor of substrate (A), or the kind, shape, amount or other factor of complex (B). Generally, however, the amount of water to use is 3–200 wt. % of the dry mass of the substrate (A); ideally, it is 5–100 wt. % of the dry mass.

The method of adding water to substrate (A) is not limited as far as the amount of water to the substrate (A) becomes within the prescribed value. For example, water need not be added to the substrate (A) which includes originally a appropriate amount of water, such as the aforementioned wet-granulated substrate (A4). If the substrate (A) is too dry with including little water, the prescribed amount of water can be added to the substrate (A) with spray, steam or other means.

There are no specific limits to the apparatus which is used to coat the surface of substrate (A) with complex (B), for this invention. But an apparatus capable of uniformly blending the substrate(A) and the complex(B) to coat (A) with (B) will work well. When the substrate (A) is granulated, an apparatus capable of coating the surface of (A) with (B) will work well. The examples of the coating apparatus are such as mixing apparatus represented by conical blender, V-type mixer, ribbon blender or kneader; and granulating apparatus represented by rolling granulator, disk-pelletizer, briquette machine or compactor.

When hydrophilic fiber is used for this invention as fibrous substance (2) in complex (B), while and/or after coating the surface of (A) with (B), the optionally further addition of a small amount of water makes the coating state more complete.

The amount of water in this case is generally no more than 20 wt. % of the total dry mass of (A) and (B), ideally 1–10 wt. %. If the amount of added water exceeds 20 wt. %, the substances coated with complex (B) cause blocking together to become clumpy or the absorption speed becomes too slow.

The resultant substance coated with complex (B) may be used as the materials for the treatment of excretion pertaining to this invention, in its state or by being dried with heat when necessary. When the Treating Material includes hydrophilic fiber, the amount of water in the Treating Material is generally no more than 50 wt. % of the dry overweight; ideally no more than 30 wt. %. If the amount of water exceeds 50 wt. %, the surface of the Treating Material becomes adhesive and all of the materials may be integrated.

On the other hand, when thermoplastic fiber is used as fibrous substance (2), the Treating Material must be heated while and/or after coating, in purpose of making the coating state more complete.

The heating temperature is ideally a level at which the thermoplastic fiber used melts and then adheres together, but do not fuse. The ideal heating temperature differs depending also on the kind of fiber used. It is; 90°–120° C. when polyethylene fiber is used; 110°–160° C. when polypropylene fiber is used; 90°–130° C. when polyethylene-polypropylene fiber is used.

Among these fibers, polyethylene-polypropylene complex fiber is most preferable because it is the composite of different fibers whose thermomelt-adhering temperature are different from each other, and therefore melt and adhered together while maintaining fiber structure.

The resulting material coated with complex (B) after above thermomelt-adhering step may be used as the materials for the treatment of excretion pertaining to this invention, in its state or by being dried at the temperature within the range of not destroying fiber structure when necessary. In this case, both thermomelt-adhering and drying of the fibers can be performed simultaneously without obstructing the process.

When thermoplastic fiber is used, the amount of water in the Treating Material is generally no more than 50 wt. % of the dry overweight; ideally no more than 30 wt. % as in the case of hydraulic fiber.

The following pharmaceuticals such as deodorizers, perfumes, germicide, moldproofing agents, antiseptics, antiblocking agents, surface active agents, substances favored by animals such as silvervine for cats, and fillers can be included in the Treating Material, if necessary, with each item occupying from 0.01–10 wt. % of the overall weight.

These pharmaceuticals have only to exist in the Treating Material. For example, they may also be added to substrate (A) or complex (B) in advance, or may also be added while surface of substrate (A) being coated with complex (B) or after that.

The granules of the Treating Material can simply and easily be used as a toilet area, by, for example, spreading it throughout container.

When a cat, dog, or other animal deposits excretions in this "toilet," the Treating Material quickly absorbs the liquid content of the excretions and the individual granules of the Treating Material that have absorbed the liquid stick together, forming a gummous adhesive clump which can be easily picked up and removed from the rest of the Treating Material for convenient disposal.

In addition, because the Treating Material has high absorption rate and, that is, a small quantity of the Treating Material can absorb a large amount of urine; the consumption of the Treating Material can be reduced. Moreover because the fall-off rate of resin or other substance is extremely low, small granules of Treating Material seldom scatter throughout the room, therefore can be used ideally.

DESCRIPTION OF THE PREFERRED EMBODIMENTS

This invention is further explained with the examples and descriptions of the preferred embodiments of the invention, below; this invention is not, however, limited to these examples and descriptions.

"%" means "wt. %" hereafter.

1. Absorption rate:

500 ml of the Treating Material was put into a 1(one)-liter beaker and the surface was leveled horizontally. 30 g of artificial urine was put in a 50-cc throwaway syringe (manufactured by Terumo Corporation) and then was injected onto the center point on the surface of the Treating Material within the beaker, vertically, from about 2 cm high, for a five-second period. The granules of the Treating Material began to form into clumps as absorbing urine. Next, one minute after the artificial urine was injected, the clumps that absorbed urine were picked up with a pincette and their total weight was measured. The absorption rate was calculated according to the following formula.

Absorption rate (g/g)=30/(the total weight of clumps−30)

2. Absorption speed:

The same procedure as in the case of absorption rate was followed and then whether the artificial urine passed all the way down to the bottom of the 1(one)-litter beaker or not was checked. The absorption speed was evaluated according to the following criteria.

○:Treating Material swiftly absorbed artificial urine before the urine would arrive at the bottom of the beaker.

Δ:The absorption speed was a little slow and a part of artificial urine arrived at the bottom of the beaker.

X:The absorption speed was slow and artificial urine spread throughout the bottom of the beaker.

3. Clump formability

The same procedure as in the case of absorption rate was followed and then how clumpy the granules of the Treating Material became was observed.

⊚:Granules formed into clumps and the clumps did not break even when they were dropped from 1 m high.

○:Granules formed into clumps but parts of the clumps broke when they were dropped from 1 m high.

△:Granules formed into clumps but most of the clumps broke when they were dropped from 1 m high.

X:Granules formed partially into clumps but the clumps could not be picked up with pincette.

XX:Granules did not form into clumps.

4. Fall-off rate of resin and the like 100 g of the Treating Material was put into a sieve (the diameter=20 cm) having a 850 microns metal net and then was vibrated with using sieve shaker (manufactured by Iida Seisakusyo Co., Ltd.) for 10 minutes, and the content that passed through the 850 microns metal net was measured, then the content amount as fall-off rate (%) of resin and the like was defined.

EXAMPLE 1

500 g of commercially available bentonire "Kunigel V-1" (manufactured by Kunimine Industries Co., Ltd.) was put into a small-sized all-purpose 2(two)-liter mixer that had been pre-heated from the outside to approximately 50° C. Then, 100 g of water that had been heated to approximately 50° C. was put little by little into the mixer while the bentonire was being stirred at a speed of 100 rpm. Thereby the bentonire was formed into granules to obtain substrate ① (apparent density; 0.7 g/ml) that was an approximately 2–6 mm firm granulated substance.

A total of 100 g commercially available cellulose fiber (trade name:ARBOCEL BC-200, manufactured by J.Rettenmaier&Sohne GMBH Co., fiber diameter:20 microns, the content that falls below 30 microns of fiber length: 15%) having average fiber length of 200 microns and 400 g crosslinked polyacrylate water-absorbent resin (trade name: SANWET IM-5000MPS, manufactured by Sanyo Chemical Industries, Ltd., average particle diameter: 35 microns) were uniformly mixed to obtain water-absorbent resin/fiber complex (B1).

A total of 400 g substrate ① and 200 g water-absorbent resin/fiber complex(B1) were put into a high speed V-type mixer and then were mixed at a speed of 100 rpm for 5 minutes to coat substrate ① with water-absorbent resin/fiber complex (B1).

Because some fluff of cellulose fiber was observed on the coated surface, further 10 g of additional water was sprayed to the mixture while mixing at a speed of 100 rpm for another 3 minutes, thereby obtaining the Treating Material S1 (apparent density; 0.62 g/ml) according to this invention.

With respect to this Treating Material S1, absorption rate, absorption speed, clump formability, and fall-off rate of resin and the like were measured. Measurement results are shown in Table 1.

EXAMPLE 2

Commercially available granulated pulp particles (Trade name:ECONOMY, manufactured by Super Cat Co.,Ltd., particle diameter: 3–15 mm) were prepared as substrate ② (apparent density: 0.28 g/ml).

A total of 75 g commercially available cellulose fiber (trade name:ARBOCEL BC-1000, manufactured by J.Rettenmaire&Sohne GMBH Co., fiber diameter:20 microns, the content that falls below 30 microns of fiber length: 7%) having average fiber length of 700 microns and 425 g starch-polyacrylate graft water-absorbent resin (trade name: SANWET IM-1000MPS, manufactured by Sanyo Chemical Industries, Ltd., average particle diameter: 35 microns) were uniformly mixed to obtain water-absorbent resin/fiber complex (B2).

500 g of substrate ② was put into a conical blender and then 100 g of additional water was uniformly sprayed while the substrate was being stirred. Thereafter, 500 g of water-absorbent resin/fiber complex (B2) was added and mixed for 5 minutes, to coat substrate ② with water-absorbent resin/ fiber complex (B2).

Because some fluff of cellulose fiber was observed on the coated surface, further 10 g of additional water was sprayed to the mixture while mixing for another 3 minutes. The mixture was taken out to dry at 100° C. for 30 minutes, thereby obtaining the Treating Material S2 (apparent density;0.35 g/ml) according to this invention. With respect to this Treating Material S2, absorption rate, absorption speed, clump formability, and fall-off rate of resin and the like were measured. Measurement results are shown in Table 1.

EXAMPLE 3

450 g of calcium carbonate, 20 g of emulsion including acrylic acid ester adhesion 45% (trade name:AT-113, manufactured by Syowa Highpolymer Co., Ltd.), and 30 g foamed sterol powder were mixed and dry-granulated with using a briquette machine (manufactured by SINTO KOGIO Ltd.), thereby obtaining 4–6 mm sized substrate ③ (apparent density:0.65 g/ml).

A total of 100 g commercially available cellulose fiber (trade name:ARBOCEL BC-1000, manufactured by J.Rettenmaire&Sohne GMBH Co., fiber diameter:20 microns, the content that falls below 30 microns of fiber length: 7%) having average fiber length of 700 microns, 390 g starch-polyacrylate graft water-absorbent resin (trade name: SANFRESH ST-100, manufactured by Sanyo Chemical Industries, Ltd., average particle diameter: 550 microns) that was crushed to have average particle diameter of 60 microns, and 5 g powdery polyethyleneglycol 6000 (manufactured by Sanyo Chemical Industries, Ltd., melting point: 60°–70° C.) were uniformly mixed to obtain water-absorbent resin/fiber complex (B3).

500 g of substrate ③ was put into a rolling granulator and then 300 g of water-absorbent resin/fiber complex (B3) was added while 50 g of water was being uniformly sprayed, to coat substrate ③ with water-absorbent resin/fiber complex (B3).

The coated substrate was taken out to dry at 100° C. for 30 minutes, there by obtaining Treating Material S3 (apparent density: 0.57 g/ml) according to this invention.

With respect to this Treating Material S3, absorption rate, absorption speed, clump formability, and fall-off rate of resin and the like were measured. Measurement results are shown in Table 1.

EXAMPLE 4

A total of 50 g commercially available polyethylene-polypropylene complex fiber (trade name: ES fiber, manufactured by Chisso Corporation, fiber diameter: 5 microns) having average fiber length of 500 microns and 450 g crosslinked polyacrylate water-absorbent resin (aforementioned "SANWET IM-1000MPS") were uniformly mixed to obtain water-absorbent resin/fiber complex (B4).

500 g of substrate ② used in Example-2 was put into a kneader having a jacket. 50 g of water was uniformly sprayed while the substrate ② was being stirred at 30 rpm.

250 g of water-absorbent resin/fiber complex (B4) was added into the kneader in which the substrate ② was put, and then was uniformly mixed at 30 rpm for 20 minutes. Thereafter, the heat medium heated to 130° C. was supplied through the jacket to melt-adhere the fiber and the mixture was stirred for another 60 minutes so as to evaporate moisture from the fiber. Thus, Treating Material S4 (apparent density: 0.32 g/ml) according to this invention was obtained.

With respect to this Treating Material S4, absorption rate, absorption speed, clump formability, and fall-off rate of resin and the like were measured. Measurement results are shown in Table 1.

COMPARISON 1

Treating Material H1 for comparison was obtained by the same process as in Example-1 except that aforementioned water-absorbent resin "SANWET IM-5000MPS" was used alone in place of water-absorbent resin/fiber complex (B1).

With respect to this Treating Material H1 for comparison, absorption rate, absorption speed, clump formability, and fall-off rate of resin and the like were measured. Measurement results are shown in Table 1.

COMPARISON 2

A total of 500 g zeolite powder having grain size of no more than 200 mesh and 80 g water were mixed uniformly. Then, 150 g of "SANWET IM-1000MPS" was added and forcibly stirred. Thereafter, the resulting mixture was extruded with using a disk-pelletizer (manufactured by Fuji Paudaru Co., Ltd.) and dried at 100° C. for 30 minutes, thereby obtaining about 5 mm sized Treating Material H2 for comparison.

With respect to this Treating Material H2 for comparison, absorption rate, absorption speed, clump formability, and fall-off rate of resin and the like were measured. Measurement results are shown in Table 1.

COMPARISON 3

A total of 200 g sludge discharged from a paper mill (moisture content:75%) having average fiber length of 30 microns, 400 g Glauber's salt, and 50 g water were mixed. Into this mixture, was mixed another 70 g of aforementioned starch-polyacrylate graft water-absorbent resin "SAN-FRESH ST-100" that was crushed to have average particle diameter of 60 microns. The resulting mixture was extruded with using a disk-pelletizer and thereafter dried at 100° C. for 30 minutes, thereby obtaining about 3 mm sized Treating Material H3 for comparison.

With respect to this Treating Material H3 for comparison, absorption rate, absorption speed, clump formability, and fall-off rate of resin and the like were measured. Measurement results are shown in Table 1.

COMPARISON 4

A total of 400 g commercially available cellulose fiber (trade name:ARBOCEL BE 600-30PU, manufactured by J.Rettenmaier&Sohne GMBH Co., fiber diameter: 20 microns, the content that falls below 30 microns of fiber length: 90%) having average fiber length of 40 microns, 100 g starch-polyacrylate graft water-absorbent resin (trade name: SANWET IM-5000 U, manufactured by Sanyo Chemical Industries, Ltd., average particle diameter: 90 microns), and 300 g water were uniformly mixed with using a kneader, and then were extrusion-molded with using a disk-pelletizer ,thereby obtaining pellet (a) that functioned as a core layer.

On the other hand, a total of 350 g crushed pulp powder (average fiber length: 40 microns) and 100 g starch-polyacrylate water-absorbent resin (trade name: SANWET IM-1000SP, manufactured by Sanyo Chemical Industries, Ltd., average particle diameter: 15 microns) were mixed while 40 g of additional water was being sprayed, thereby obtaining mixture (b) that functioned as a skin layer.

300 g of the pellet (a) and 300 g of the mixture (b) were put into a conical blender, then were mixed at 30 rpm for 30 minutes to coat the circumference of the pellet (a) with the mixture (b), and successively were dried at 100° C. for 10 minutes. Thus, the Treating Material H4 for comparison was obtained.

With respect to this Treating Material H4 for comparison, absorption rate, absorption speed, clump formability, and fall-off rate of resin and the like were measured. Measurement results are shown in Table 1.

COMPARISON 5

A total of 100 g commercially available cellulose fiber (fiber diameter:20 microns) having average fiber length of 3,000 microns and 400 g starch-polyacrylate graft water-absorbent resin (trade name: SANWET IM-1000MPS, manufactured by Sanyo Chemical Industries, Ltd., average particle diameter: 35 microns) were mixed at 30 rpm for 60 minutes with using a conical blender. The mixture after stirring included parts rich in cellulose fiber and other parts rich in "SANWET IM-1000MPS", and therefore was extremely heterogeneous.

The Treating material H5 for comparison was obtained by the same process as in Example-2 except that the resulting mixture was used in place of water-absorbent resin/fiber complex (B2).

With respect to this Treating Material H5 for comparison, absorption rate, absorption speed, clump formability, and fall-off rate of resin and the like were measured. Measurement results are shown in Table 1.

COMPARISON 6

The Treating material H6 for comparison was obtained by the same process as in Example-3 except that the crushed pulp powder (average fiber length: 30 microns, fiber diameter: 20 microns, the content that falls below 30 microns of fiber length: 97%) was used in place of the fiber used for preparing water-absorbent resin/fiber complex (B3).

With respect to this Treating Material H6 for comparison, absorption rate, absorption speed, clump formability, and fall-off rate of resin and the like were measured. Measurement results are shown in Table 1.

TABLE 1

| Treating material No. | Absorption rate [g/g] | Absorption speed | Clump formability | Fall-off rate [%] |
|---|---|---|---|---|
| Invention | | | | |
| S1 | 3.5 | ○ | ⊚ | 0.3 |
| S2 | 3.7 | ○ | ⊚ | 0.2 |
| S3 | 3.4 | ○ | ⊚ | 0 |
| S4 | 3.6 | ○ | ⊚ | 0.3 |
| Comparison | | | | |

TABLE 1-continued

| Treating material No. | Absorption rate [g/g] | Absorption speed | Clump formability | Fall-off rate [%] |
|---|---|---|---|---|
| H1 | 1.8 | Δ | ○ | 21.2 |
| H2 | immeasurable | X | X | 4.2 |
| H3 | immeasurable | X | X | 2.1 |
| H4 | 2.0 | Δ | Δ | 2.8 |
| H5 | 2.4 | Δ | Δ | 6.6 |
| H6 | 2.1 | Δ | ○ | 12.4 |

As is clear from the results of Table 1, the Treating Materials S1–S4 of this invention have low fall-off rate of resin and the like, high absorption speed, and high absorption rate, as compared with the Treating Material H1 for comparison, which was coated with only water-absorbent resin.

The Treating Materials S1–S4 of this invention show very improved ability to form into clumps, as compared with the granulated Treating Materials H2 and H3 for comparison comprising water-absorbent resin and inorganic substance or organic substance respectively. The Treating Materials S1–S4 also show very improved ability to form into clumps, as compared with the complex Material H4 for comparison having two layers of crushed pulp and water-absorbent resin.

In addition, the Treating Materials S1–S4 of this invention with applied fibrous substance of specific fiber length show low fall-off rate of resin and the like, as well as excellent ability to form into clumps, and high absorption speed, and high absorption rate, as compared with the Treating Materials H5 and H6 for comparison, to which fibrous substance of the fiber length outside this invention was applied.

What is claimed is:

1. A material for treating excretions of pet animals comprising:
   100 parts by weight of a substrate (A) selected from the group consisting of an inorganic powder, short organic fibers, crushed cellulose, and granulated forms of each of said powder, fibers, and cellulose, the substrate (A) having a surface; and
   from 5 to 300 parts by weight of water-absorbent resin/fiber composite (B) as a coating on the surface of said substrate (A), said composite (B) being a mixture of from 50 to 95% by weight of a water-absorbent resin fine powder, from 5 to 50% by weight of a fibrous substance having an average fiber length of from 50 to 2,000 μm and from 0 to 10% by weight of a hydrophilic thermoplastic substance.

2. The material of claim 1, wherein the water-absorbent resin fine powder has a water absorption capability with respect to pure water of from 100 to 1,000 ml/g.

3. The material of claim 1, wherein the water-absorbent resin fine powder has an average particle size of from 1 to 150 μm.

4. The material of claim 1, wherein the average fiber length of the fibrous substance is from 100 to 1,000 μm and the content of fibrous substance having a length not longer than 30 μm is not more than 30% by weight of the total amount of fibrous substance.

5. The material of claim 1, wherein said fibrous substance is selected from the group consisting of hydrophilic fibers and thermoplastic fibers.

6. The method of claim 1, wherein said composite (B) contains from 60 to 90% by weight of the water-absorbent resin fine powder.

7. A method of producing a material for treating excretions of pet animals, comprising the steps of:
   adding from 3 to 200 parts by weight of water and from 5 to 300 parts by weight of a water-absorbent resin/fiber composite (B) to 100 parts by weight of a substrate (A) having a surface and selected from the group consisting of an inorganic powder, short organic fibers, crushed cellulose, and granulated forms of each of said powder, fibers, and cellulose, to coat the surface of the substrate (A) with the composite (B) and form said material, said water-absorbent resin/fiber composite (B) being a mixture of from 50 to 95% by weight of a water-absorbent resin fine powder, from 5 to 50% by weight of a fibrous substance having an average fiber length of from 50 to 2,000 μm, and from 0 to 10% by weight of a hydrophilic thermoplastic substance.

8. The method of claim 7, wherein the water-absorbent resin fine powder has a water absorption capability with respect to pure water of from 100 to 1,000 ml/g.

9. The method of claim 7, wherein the water-absorbent resin fine powder has an average particle size of from 1 to 150 μm.

10. The method of claim 7, wherein the average fiber length of the fibrous substance is from 100 to 1,000 μm and the content of fibrous substance having a length not longer than 30 μm is not more than 30% by weight of the total amount of fibrous substance.

11. The method of claim 7, wherein said fibrous substance is selected from the group consisting of hydrophilic fibers and thermoplastic fibers.

12. The method of claim 7, comprising the further step of drying the resulting material after the substrate (A) has been coated with the composite (B).

13. The method of claim 12, wherein the water-absorbent resin fine powder has a water absorption capability with respect to pure water of from 100 to 1,000 ml/g.

14. The method of claim 12, wherein the water-absorbent resin fine powder has an average particle size of from 1 to 150 μm.

15. The method of claim 12, wherein the average fiber length of the fibrous substance is from 100 to 1,000 μm and the content of fibrous substance having a length not longer than 30 μm is not more than 30% by weight of the total amount of fibrous substance.

16. The method of claim 12, wherein said fibrous substance is selected from the group consisting of hydrophilic fibers and thermoplastic fibers.

17. The method of claim 7, wherein said composite (B) contains from 60 to 90% by weight of the water-absorbent resin fine powder.

* * * * *